(12) United States Patent
Sakamoto et al.

(10) Patent No.: US 10,302,154 B2
(45) Date of Patent: May 28, 2019

(54) ELECTROMAGNETIC CLUTCH

(71) Applicant: Valeo Japan Co., Ltd., Saitama (JP)

(72) Inventors: Katsumi Sakamoto, Saitama (JP); Yuichi Imai, Saitama (JP); Hidetoshi Arahata, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 833 days.

(21) Appl. No.: 14/819,625

(22) Filed: Aug. 6, 2015

(65) Prior Publication Data

US 2016/0040728 A1  Feb. 11, 2016

(30) Foreign Application Priority Data

Aug. 8, 2014 (JP) .................. 2014-161968
Apr. 2, 2015 (JP) .................. 2015-075944

(51) Int. Cl.
*F16D 27/112* (2006.01)
*F16D 27/00* (2006.01)

(52) U.S. Cl.
CPC ...... *F16D 27/112* (2013.01); *F16D 2027/008* (2013.01)

(58) Field of Classification Search
None
See application file for complete search history.

(56) References Cited

U.S. PATENT DOCUMENTS

| 5,687,823 A * | 11/1997 | Nakagawa | F16D 9/02 |
| | | | 192/84.961 |
| 5,941,357 A * | 8/1999 | Tabuchi | F16D 27/112 |
| | | | 192/84.961 |
| 2017/0016488 A1* | 1/2017 | Ishikawa | F16D 27/112 |
| 2017/0030420 A1* | 2/2017 | Konishi | F16D 27/14 |
| 2017/0122384 A1* | 5/2017 | Nakajima | F16D 3/68 |

FOREIGN PATENT DOCUMENTS

JP  2008-014444 A  1/2008

* cited by examiner

*Primary Examiner* — Jacob S. Scott
(74) *Attorney, Agent, or Firm* — Osha Liang LLP

(57) ABSTRACT

An electromagnetic clutch includes a rotor, an armature plate that is disposed to face the rotor, an excitation coil that is accommodated on the inside of the rotor, and generates an attracting force attracting the armature plate onto the rotor, a temperature fuse that is disposed on the excitation coil side further than a side end surface of the rotor, and blocks the electric connection to the excitation coil when exceeding a predetermined temperature, an outer and inner magnetic blocking portion on the side end surface of the rotor, and an intermediate magnetic blocking portion in the armature plate in a position between the outer and the inner magnetic blocking portions, in which an annular groove is formed on the side end surface to include the inner magnetic blocking portion, and in which a friction member protruding from the side end surface is disposed in the annular groove.

12 Claims, 10 Drawing Sheets

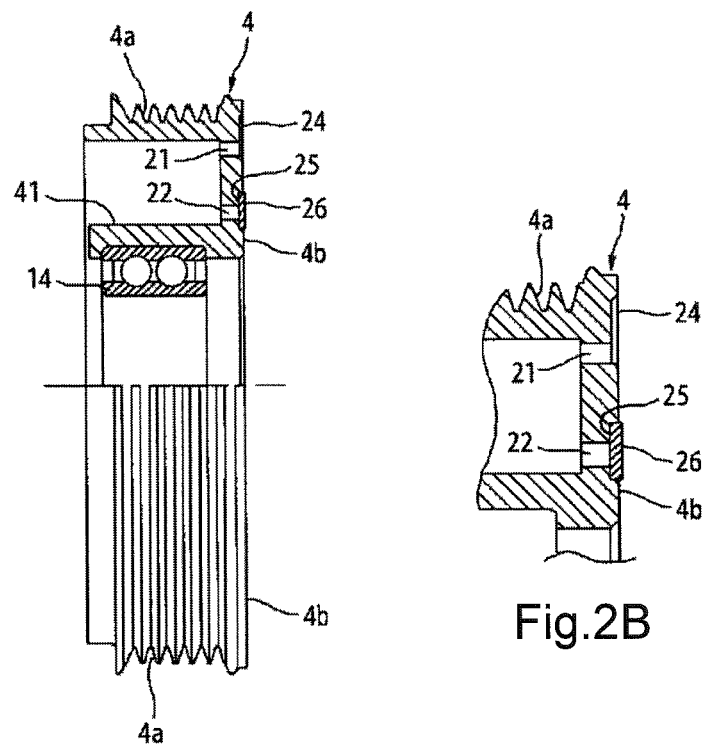
Fig.2A
Fig.2B
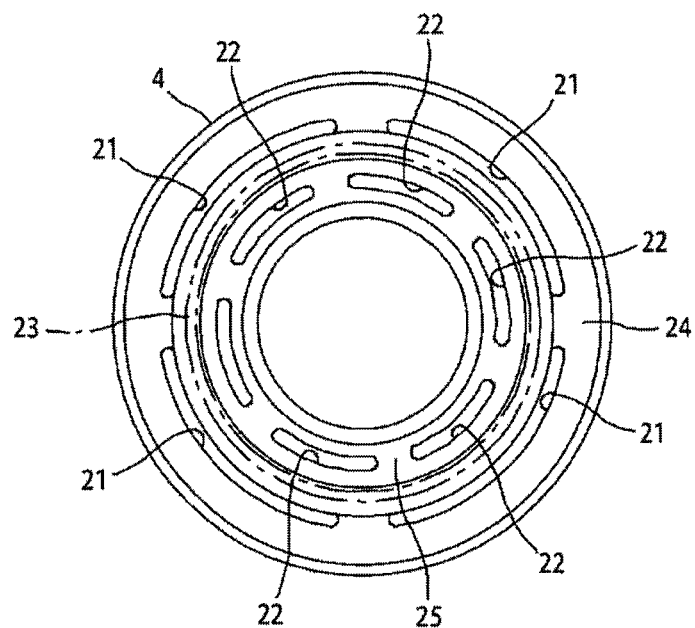
Fig.2C

ELECTROMAGNETIC CLUTCH

BACKGROUND OF THE INVENTION

1. Field of the Invention

The present invention relates to an electromagnetic clutch used for connecting and disconnecting power transmitting from a power source to a compressor and, in particular, to an electromagnetic clutch in which a friction member is provided on a side end surface of a rotor onto which an armature plate comes in contact.

2. Description of Related Art

As illustrated in FIGS. 10A and 10B, a general electromagnetic clutch used in a compressor of a vehicular air conditioner includes a rotor 4 that is formed of a magnetic material, is fitted onto an outer periphery of a cylindrical portion 16 through a bearing 14 to be rotatable in which a driving shaft 20 of a compressor 2 is journaled, and is rotated by receiving a rotational force from a rotation driving source; an armature plate 5 that is formed of a magnetic material, is connected to the driving shaft 20 to be relatively non-rotatable, and is disposed to face a side end surface of the rotor 4 across a slight gap; an excitation coil 3 that is accommodated in an inside of the rotor 4, forms a magnetic circuit through the rotor 4 and the armature plate 5 by being energized, and generates an attracting force that electromagnetically attracts the armature plate 5 onto the rotor 4; an outer magnetic blocking portion 21 provided on the side end surface of the rotor 4, that is configured with an annular shape centered on the driving shaft 20 or a plurality of arc shapes disposed on a virtual circle centered on the driving shaft 20; an inner magnetic blocking portion 22 provided on the end surface of the rotor 4, that is configured with an annular shape centered on the driving shaft 20 or a plurality of arc shapes disposed on a virtual circle centered on the driving shaft 20, which is provided inside further than the outer magnetic blocking portion 21 in a radial direction; and an intermediate magnetic blocking portion 23 provided in the armature plate 5, that is configured with an annular shape centered on the driving shaft 20 or a plurality of arc shapes disposed on a virtual circle centered on the driving shaft 20, which is formed in a position facing a position between the outer magnetic blocking portion 21 and the inner magnetic blocking portion 22 in the radial direction.

A temperature fuse 15 which blocks electric connection to the excitation coil 3 when exceeding a predetermined temperature is provided on the excitation coil 3 side from the side end surface of the rotor 4. If the compressor 2 becomes unrotatable for some reason, slip occurs between the rotor 4 that is rotated by receiving the rotational driving force from the driving source and the armature plate 5 that is connected to the driving shaft 20 of the compressor 2 that is unrotatable. The temperature fuse 15 is fused by friction heat caused by the slip and a connection of the clutch is cut (electromagnetic attracting force that attracts the armature plate 5 onto the rotor 4 is removed) by blocking electric connection to the excitation coil 3.

In addition, in order to reduce occurrence of unpleasant noise when the armature plate 5 hits on the rotor 4, a configuration is proposed in which an annular groove 24 is formed on the side end surface of the rotor 4 facing the armature plate 5 so as to include the outer magnetic blocking portion 21, and a ring-shaped friction member 27 formed of a non-magnetic material such as thermosetting resin is mounted on the annular groove 24 in a state of being slightly protruded from the side end surface 4b of the rotor 4. In this configuration, when the armature plate 5 is attracted toward the rotor 4 side by the electromagnetic force of the excitation coil 3, the armature plate 5 comes in contact with the friction member 27 before coming into contact with the side end surface of the rotor 4 (JP 2008-014444 A).

The friction member 27 is disposed to cover the outer magnetic blocking portion 21 for ensuring a magnetic path and is slightly protruded from the side end surface of the rotor 4. Since the friction member 27 and the armature plate 5 have an elasticity in themselves, when the armature plate 5 is attracted to the rotor 4, the armature plate 5 comes into contact not only with the friction member 27 but also with the side end surface 4b of the rotor 4 in a region close to an inner periphery than the friction member 27. As described above, when the rotor 4 and the armature plate 5 are engaged, both of the friction member 27 and the inward region of the side end surface than the friction member 27 come contact with the armature plate 5, thereby performing stable transmission of torque.

However, if the compressor becomes unable to rotate and slip occurs between the rotor 4 and the armature plate 5, sliding occurs at a portion close to the inner periphery of the rotor 4 and the armature plate 5, which are similar magnetic metal materials, and hence adhesion is likely to occur. If the adhesion between similar metal materials occurs at a region close to an outer periphery of which a peripheral speed is fast, a relative speed difference is large, generated friction heat is also large, and thereby it does not lead to sticking. However, if the adhesion occurs at a region close to the inner periphery of which the peripheral speed is slow, since both a difference in a relative speed and occurring friction heat are small, hardening is likely to occur between melted metals and a sticking phenomenon of a sliding surface is caused before the temperature fuse 15 is operated. As a result, there is a concern that the engagement of the clutch is not disengaged without fusing of the temperature fuse 15.

SUMMARY OF THE INVENTION

The invention is made in view of the above circumstances and a main object of the invention is to provide an electromagnetic clutch in which a concern of sticking between a rotor and an armature plate is avoided and a temperature fuse can be reliably fused even if slip occurs between the rotor and the armature plate.

According to an aspect of the present invention, there is provided an electromagnetic clutch characterized by including: a rotor that is formed of a magnetic material and is rotated by receiving a rotational force from a rotation driving source; an armature plate that is formed of the magnetic material, is connected to a driving shaft of a compressor to be relatively non-rotatable, and is disposed to face a side end surface of the rotor across a slight gap; an excitation coil that is accommodated in the inside of the rotor, forms a magnetic circuit through the rotor and the armature plate by being energized, and generates an attracting force magnetically attracting the armature plate onto the rotor; a temperature fuse that is disposed on the excitation coil side further than the side end surface of the rotor and blocks the electric connection to the excitation coil when exceeding a predetermined temperature; an outer magnetic blocking portion provided on the side end surface of the rotor, which is configured with an annular shape centered on the driving shaft or a plurality of arc shapes disposed on a virtual circle centered on the driving shaft; an inner magnetic blocking portion provided on the side end surface of the rotor, which is configured with an annular shape centered on the driving shaft or a plurality of arc shapes disposed on the virtual circle centered on the driving shaft, which is provided inside further than the outer magnetic blocking portion in a radial direction; and an intermediate magnetic blocking portion provided in the armature plate, which is configured with an annular shape centered on the driving shaft or a plurality of arc shapes disposed on the virtual circle centered on the driving shaft, which is formed in a position facing a position between the outer magnetic blocking portion and the inner magnetic blocking portion in the radial direction, in which four poles are formed by opposing surfaces formed on outside and inside of each blocking portion of the outer magnetic blocking portion, the intermediate magnetic blocking portion, and the inner magnetic blocking portion in the radial direction by disposing the rotor and the armature plate so as to face each other, in which an annular groove is formed on the side end surface of the rotor so as to include the inner magnetic blocking portion, and in which a friction member protruding from the side end surface of the rotor is disposed in the annular groove.

Consequently, the friction member is disposed in the annular groove formed so as to include the inner magnetic blocking portion of the side end surface of the rotor so as to protrude from the side end surface of the rotor. Thus, even if slip occurs between the rotor and the armature plate for some reason, the rotor and the armature plate come into contact with each other through the friction member in the region close to the inside of which a peripheral speed is slow. Thus, it is possible to avoid a concern that the rotor and the armature plate come into slide contact with each other and then are stuck together.

Preferably, an annular groove, which includes the outer magnetic blocking portion and narrows a width of a magnetic path (a width of the pole in a radial direction) at the outside of the outer magnetic blocking portion so as to dispose the magnetic path radially outward, is formed on the side end surface of the rotor.

By adding this configuration, the pole of the outside of the annular groove including the outer magnetic blocking portion is configured in a position further from a rotational center of the rotor 4 and it is possible to improve transmission of a torque from the rotor to the armature plate.

In the aspect, the friction member protruding from the side end surface of the rotor may be further disposed in the annular groove formed to include the outer magnetic blocking portion.

According to such a configuration, the armature plate comes into contact with the friction member before the armature plate comes into contact with the rotor when being attracted, even in the vicinity of the outer peripheral edge of the rotor and the armature plate. Thus, it is possible to reduce impact noise.

In the aspect, it is preferable that the poles configure a first pole, a second pole, a third pole, and a fourth pole from the outside in the radial direction, and the third pole has a width in the radial direction of 60% or more of a width of the second pole in the radial direction.

Disposing the friction member so as to include the inner magnetic blocking portion, there is a concern that a magnetic path may be excessively narrowed on both sides of the inner magnetic blocking portion in the radial direction. However, it is possible to ensure the attracting force by making the width of the third pole in the radial direction be 60% or more of the width of the second pole in the same direction without increasing a magnetic resistance.

In the aspect, the side end surface of the rotor may be formed in a center concave shape such that a separation distance from the armature plate is reduced toward the outside in the radial direction during electric disconnection to the excitation coil. Alternatively, a side end surface of the armature plate facing the side end surface of the rotor may be formed in a center concave shape such that a separation distance from the side end surface of the rotor is reduced toward the outside in the radial direction during electric disconnection to the excitation coil.

In such a configuration, the outer periphery side further than the friction member can come into contact with the armature plate from an initial use and the transmission of a torque by the friction can be stably ensured while avoiding a concern of sticking by slip between metals (slide contact between the rotor and the armature plate) when the compressor becomes unable to rotate.

Furthermore, both the metal surface on the outer periphery side of the side end surface and the friction member on the inner periphery side come into contact with the armature plate from the initial use. Thus, it is possible to avoid the phenomenon that only the friction member is significantly worn.

In the aspect, it is preferable that a center concave depth of the side end surface of the rotor or the side end surface of the armature plate may be formed such that an inner peripheral edge of the side end surface is lower than an outer peripheral edge of the side end surface by 30 µm to 60 µm. Further, a protrusion amount of the friction member from the side end surface of the rotor is 10 µm to 50 µm.

As described above, according to the invention, the annular groove is provided so as to include the inner magnetic blocking portion. Thus, formation of the poles is not inhibited on the outside and the inside of the magnetic blocking portion in the radial direction by the annular groove. In addition, thanks to the friction member provided in the position of the inner magnetic blocking portion, it helps to transmit the torque during normal operation and makes it possible to avoid a concern of sticking between similar types of metals even if slip occurs between the rotor and the armature plate for some reason, since the slip at the region close to the inside where the peripheral speed is rather slow is made between the rotor and the armature plate through the friction member.

Therefore, friction heat generated by slip between the friction member and the armature plate is reliably detected by the temperature fuse disposed on the excitation coil side further than the side end surface of the rotor, the electric connection to the excitation coil is rapidly blocked, and it is possible to ensure a failsafe function.

In addition, the annular groove including the outer magnetic blocking portion and narrowing the width of the magnetic path (width of pole in the radial direction) at the outside of the outer magnetic blocking portion so as to dispose the magnetic path radially outward is formed on the side end surface of the rotor. Thus, the pole on the outside of the annular groove is configured in the position further from the rotational center of the rotor and it is possible to improve the transmission of a torque from the rotor to the armature plate.

Furthermore, the friction member is also provided in the annular groove on the outside of the rotor. Thus, it is possible to further stably transmit the torque and there is no concern of adhesion or sticking after adhesion when the slip occurs, since the rotor and the armature plate slide through the friction members also in the region close to the outer periphery in addition to the region close to inner periphery.

Moreover, there may be a concern that the magnetic path of the pole formed between the intermediate magnetic blocking portion and the inner magnetic blocking portion is narrowed by providing the annular groove for mounting the friction member so as to include the inner magnetic blocking portion. However, a significant increase in the magnetic resistance is not caused and it is possible to ensure required sufficient attracting force regardless of mounting of the friction member by setting the width of the pole to be 60% or more of the width of the magnetic path of the pole formed between the outer magnetic blocking portion and the intermediate magnetic blocking portion.

Furthermore, the side end surface of the rotor is formed such that the distance from the armature plate during the electric disconnection of the excitation coil is decreased toward the outside in the radial direction or the side end surface of the armature plate facing the side end surface of the rotor is formed such that the distance from the side end surface of the rotor during the electric disconnection of the excitation coil is decreased toward the outside in the radial direction. Thus, a sufficient surface pressure is ensured even in the region close to the outer periphery of the rotor, and thus it is possible to maintain the transmission of a torque during a normal operation of the compressor. In addition, both the metal surface on the outer periphery side of the side end surface and the friction member on inner periphery side come into contact with the armature plate from the initial use. Thus, it is possible to avoid the phenomenon that only the friction member is significantly worn and to maintain the function for avoiding sticking between the rotor and the armature plate over a longer period of time.

BRIEF DESCRIPTION OF THE DRAWINGS

FIG. 1A is a view illustrating an entire configuration thereof, and FIG. 1B is an enlarged cross-sectional view of a portion close to an outer periphery.

FIGS. 2A, 2B, and 2C are views illustrating a rotor used in the electromagnetic clutch, FIG. 2A is a side view of the rotor in which a portion thereof is cut out, FIG. 2B is a cross-sectional view of a vicinity (portion in which an excitation coil is accommodated) of a peripheral edge of the rotor, and FIG. 2C is a front view of the rotor.

FIG. 3A is a side cross-sectional view thereof, and FIG. 3B is a front view of the armature plate.

FIG. 6A is a view illustrating an entire configuration thereof, and FIG. 6B is an enlarged view illustrating a part of FIG. 6A.

FIG. 9A is a view illustrating an entire configuration thereof, and FIG. 9B is an enlarged view illustrating a part of FIG. 9A.

FIG. 10A is a perspective view of a rotor, and FIG. 10B is a side sectional view.

DESCRIPTION OF EMBODIMENTS

Hereinafter, embodiments of an electromagnetic clutch of the invention will be described with reference to the accompanying drawings.

First Embodiment

Figure 1A:
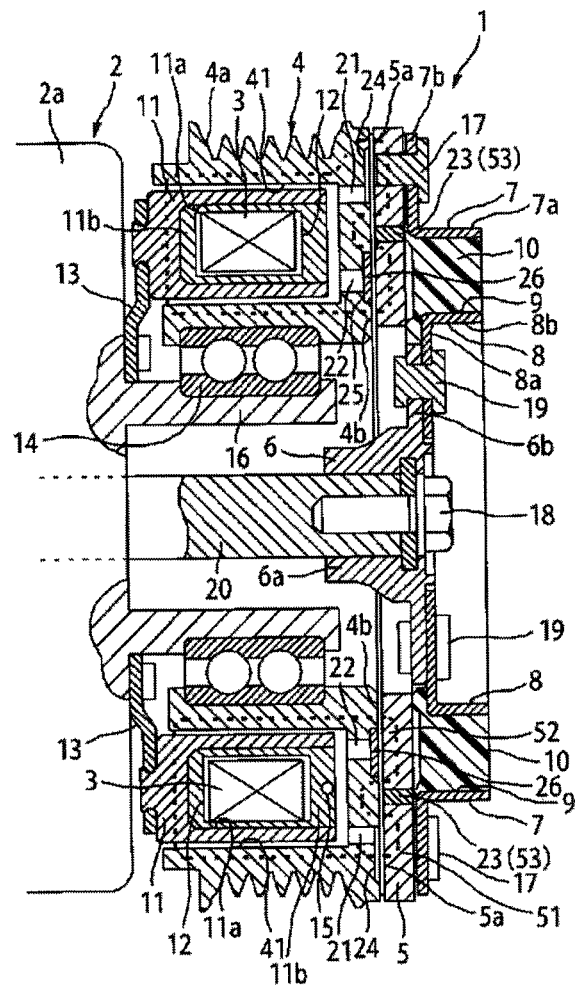
FIGS. 1A and 1B are cross-sectional views illustrating a first embodiment of an electromagnetic clutch according to the invention.
Figure 1B:
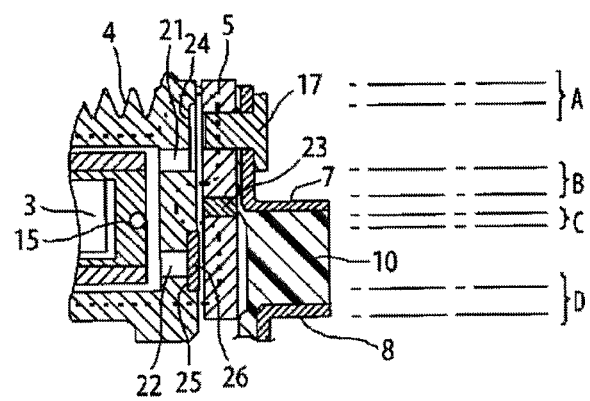

In FIGS. 1A and 1B, a first embodiment of an electromagnetic clutch 1 is illustrated. The electromagnetic clutch 1 can intermittently supply a rotational driving force from a power source such as an engine or a motor to a compressor 2 that is a driven apparatus. The electromagnetic clutch 1 includes a rotor 4 that is supported to be rotatable centered on a driving shaft 20 of the compressor 2, an armature plate 5 that faces the rotor 4 in an axial direction, a hub 6 that is fixed to the driving shaft 20 of the compressor 2 and rotates together with the driving shaft 20, an outer plate 7 that is connected to the armature plate 5, an inner plate 8 that is connected to the hub 6, and an elastic member 10 that is interposed between the outer plate 7 and the inner plate 8.

The rotor 4 is formed in an annular shape by a magnetic material, as illustrated in FIGS. 2A to 2C, is formed of grooves 4a for mounting a coupling belt for coupling the driving source to an outer periphery thereof, is provided with a bearing 14 on an inner periphery, and is fitted onto an outer periphery of a cylindrical portion 16 through the bearing 14 to be rotatable in which the driving shaft 20 protruding from a housing 2a of the compressor 2 is journaled. A side end surface 4b of the rotor 4 that is opposite to a body of the compressor 2 is formed in a planar shape that is substantially perpendicular to an axis of the rotor 4, and configures a friction surface facing the armature plate 5 described below.

Figure 3A:
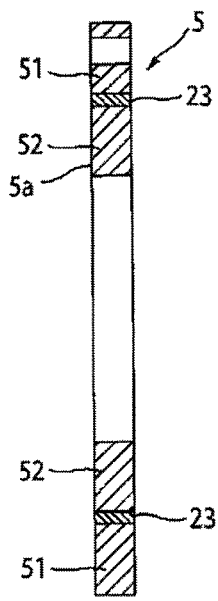
FIGS. 3A and 3B are views illustrating an armature plate used in the electromagnetic clutch.
Figure 3B:
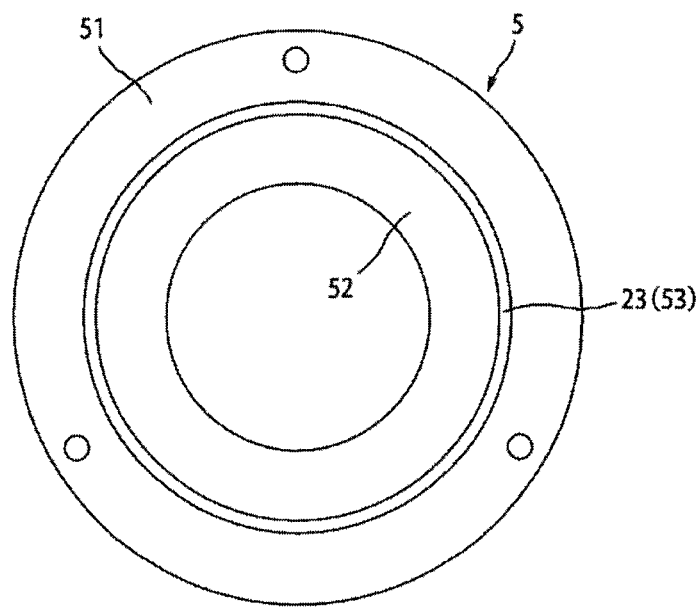

As illustrated in FIGS. 3A and 3B, the armature plate 5 is formed in a disk shape by a magnetic material, is fixed to the outer plate 7 described below, and has a side end surface 5a facing the side end surface 4b of the rotor 4 across a slight gap. The side end surface 5a is configured of a friction surface that is formed in a planar shape that is substantially perpendicular to the axis of the rotor 4 and faces the rotor 4.

An excitation coil 3 is accommodated in a coil groove 11a of a stator housing 11 and is wound around a bobbin 12 fixed by a resin mold 11b. The stator housing 11 in which the excitation coil 3 is accommodated is fixed to the housing 2a of the compressor 2 through a mounting plate 13. The rotor 4 is provided with an annular space 41 which is opened to the housing of the compressor 2. The stator housing 11 in which the excitation coil 3 is housed in the annular space 41 with a predetermined clearance.

Thus, the rotor 4 is provided so as to cover the excitation coil 3 from the armature plate side and rotates along the excitation coil without coming into contact with the excitation coil 3.

A temperature fuse 15, which is fused when exceeding a predetermined temperature and blocks the electric connection to the excitation coil 3, is provided on the excitation coil side further than the side end surface 4b of the rotor 4. For example, the temperature fuses 15 are fixed to the vicinity of an opening end of the coil groove 11a of the stator housing 11 by the resin mold 11b. A plurality of temperature fuses 15 may be provided along the excitation coil 3 and are connected to the excitation coil 3 in series, and the electric connection to the excitation coil 3 is blocked if one of the temperature fuses 15 is fused.

Meanwhile, on the side end surface 4b of the rotor 4, an outer magnetic blocking portion 21 and an inner magnetic blocking portion 22, which make a passage of magnetic flux generated by energizing the excitation coil 3 go around by blocking the passage thereof, are intermittently formed in a circumferential direction along virtual circles of which distances from the axis (driving shaft 20) of the rotor 4 are different.

That is, as illustrated in FIGS. 2A to 2C, the outer magnetic blocking portions 21 are configured by forming four arc-shaped long holes on the virtual circle centered on the axis of the rotor 4 at regular intervals. In addition, the inner magnetic blocking portions 22 are configured by forming six arc-shaped long holes on the virtual circle of which a diameter is smaller than that of the virtual circle of the outer magnetic blocking portions 21 centered on the axis of the rotor 4 at regular intervals.

On the other hand, on the side end surface 5a of the armature plate 5, an intermediate magnetic blocking portion 23 for making the magnetic flux generated by energizing the excitation coil 3 go around is provided in a position shifted in the radial direction from the magnetic blocking portions 21 and 22 formed on the side end surface 4b of the rotor 4.

That is, as illustrated in FIGS. 3A and 3B, in this example, the intermediate magnetic blocking portion 23 is configured by a ring-shaped member 53 made of a non-magnetic metal and the armature plate 5 is formed by one disk-shaped plate having no hole by sticking the ring-shaped member 53 between an outer annular plate 51 and an inner annular plate 52 made of a magnetic metal.

Thus, in a state where the rotor 4 and the armature plate 5 face each other by matching the axes thereof, a first pole A is formed in a portion on the outside of the outer magnetic blocking portion 21 in the radial direction, a second pole B is formed in a portion between the outer magnetic blocking portion 21 and the intermediate magnetic blocking portion 23, a third pole C is formed between the intermediate magnetic blocking portion 23 and the inner magnetic blocking portion 22, a fourth pole D is formed in a portion of the inside of the inner magnetic blocking portion 22 in the radial direction, a magnetic circuit in which magnetic flux passes through a periphery of the excitation coil 3 via the first pole A, the second pole B, the third pole C, and the fourth pole D is formed by energizing the excitation coil 3, and thereby a attracting force that attracts the armature plate 5 to the rotor 4 is generated.

The outer plate 7 is configured to have a cylindrical holding portion 7a extending in the axial direction for holding the elastic member 10 and a flange 7b extending from an end portion of the holding portion 7a on the armature plate side along a surface of the armature plate 5, and is fixed to the armature plate 5 by rivets 17 mounted on the flange 7b.

The hub 6 is fixed to the end portion of the driving shaft 20 by a bolt 18 and the inner plate 8 is fixed to a flange 6b extending in the radial direction from a body 6a of the hub 6 fixed to the driving shaft 20 by rivets 19. The inner plate 8 is a body separated from the hub 6, has a substantially disk shape, and is configured to have a base portion 8a that is put on the flange 6b of the hub 6 and is fixed by the rivets 19, and a holding portion 8b that is erected from an outer peripheral edge of the base portion 8a along the axial direction in a substantially cylindrical shape and holds the elastic member 10.

Figure 4A:
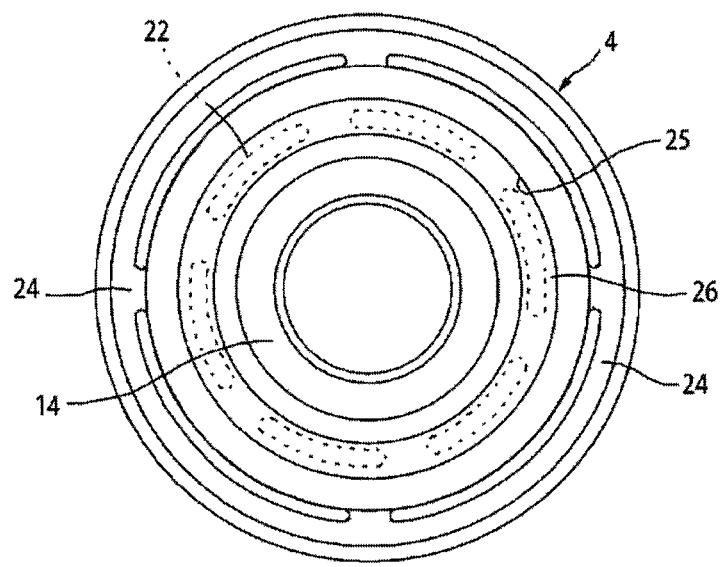
FIG. 4A is a view illustrating a side end surface of the rotor facing the armature plate and FIG. 4B is a view of the electromagnetic clutch viewed from an axial direction of a driving shaft.
Figure 4B:
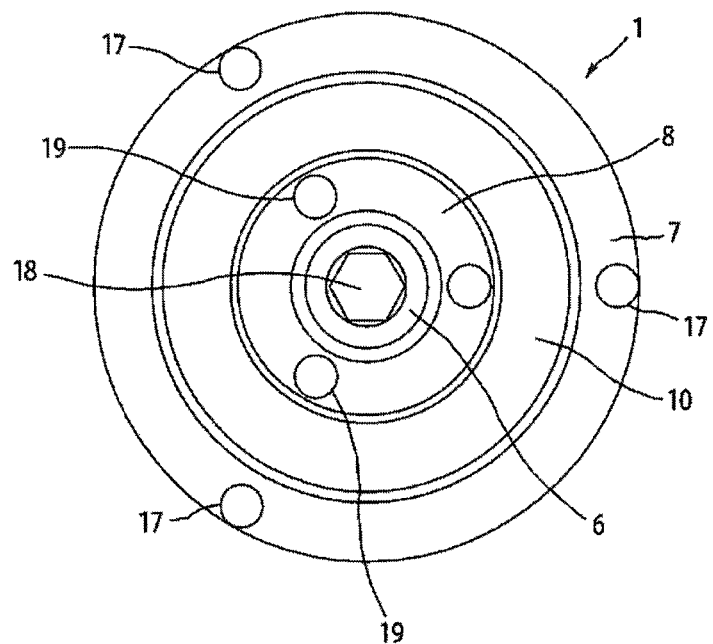

Then, as also illustrated in FIG. 4B, the outer plate 7 and the inner plate 8 are arranged on the same plane, the elastic member 10 is interposed in an annular space 9 formed between the holding portion 7a of the outer plate 7 and the holding portion 8b of the inner plate 8, the elastic member 10 is adhered to both the outer plate 7 and the inner plate 8, and thereby the outer plate 7 and the inner plate 8 are connected through the elastic member 10.

The elastic member 10 is configured of an annular-shaped synthetic rubber (NBR, chlorinated butyl, and the like) provided around an entire periphery of the holding portion 7a of the outer plate 7 and the holding portion 8b of the inner plate 8, a torque fluctuation in a rotation direction is absorbed by twisting, and thus damage of the driving shaft 20 and the like resulting from the torque fluctuation is prevented. In addition, deformation due to the armature plate 5 attracted to the rotor 4 is allowed by the elasticity of the elastic member 10. If the excitation coil 3 is energized, the armature plate 5 is attracted onto the side end surface side of the rotor 4 by the elastic deformation of the elastic member 10 and if the excitation coil 3 is deenergized, the armature plate 5 is separated from the side end surface of the rotor 4 by a restoring force of the elastic member 10.

In the configuration described above, as also illustrated in FIG. 4A, an annular groove 25 formed in a circular shape is formed on the side end surface 4b of the rotor 4 centered on the axis of the rotor 4 so as to include the inner magnetic blocking portion 22, and a friction member 26 is disposed in the annular groove 25.

The friction member 26 is configured of a non-magnetic material, is formed in a circular shape and in a planar shape having a diameter according to a size of the annular groove 25, is accommodated and fixed in the annular groove 25 so that the surface facing the armature plate 5 slightly protrudes (in this example, it becomes 0.010 mm to 0.050 mm) from the side end surface 4b of the rotor 4.

The friction member 26 is provided to obtain functions for a predetermined elastic deformation, reduction of impact noise, torque transmission, wear resistance, and the like. For example, the friction member 26 can be formed by using a material in which a base material is formed of a fiber material such as aramid fiber, nonferrous metal fiber, and inorganic fiber, in which a filler, friction-characteristic improving material, and the like are mixed, and which is combined with a binder such as phenol resin.

The attracting force can be controlled by adjusting a width in the radial direction between the second pole B and the third pole C based on the positional relationship between the inner magnetic blocking portion 22 on which the friction member 26 is mounted and the intermediate magnetic blocking portion 23 of the armature plate 5. In this example, the width of the third pole C in the radial direction is set to be 60% or more of the width of the second pole B in the radial direction for ensuring a friction torque by the friction member 26 or the attracting force of each pole.

Furthermore, in this example, an annular groove 24 is formed on the side end surface 4b of the rotor 4 so as to include the outer magnetic blocking portion 21. Since the annular groove 24 is formed in a circular shape centered on the axis of the rotor 4, the annular groove 24 is formed having a depth equivalent to or shallower than a depth of the annular groove 25.

Based on the configuration described above, a basic operation and the like of the electromagnetic clutch 1 are described below. When the excitation coil 3 is not energized, the armature plate 5 is in a state of being separated from the side end surface 4b of the rotor 4 by an elastic force of the elastic member 10 mounted through the outer plate 7, and the rotor 4 is in a state of being idle. On the other hand, if the excitation coil 3 is energized, as illustrated in FIGS. 1A and 1B, the magnetic circuit is formed in the rotor 4 and the armature plate 5, a magnetic attraction force is generated, and the armature plate 5 is attracted onto the rotor 4 side against the elastic force of the elastic member 10.

In this case, the armature plate 5 initially abuts the friction member 26 which is provided on the annular groove 25 so as to protrude from the side end surface 4b of the rotor 4. Thus, the impact noise when the armature plate 5 comes into contact with the side end surface 4b of the rotor 4 is reduced. Then, a portion close to the outer periphery of the armature plate 5 abuts a portion close to the outer periphery of the side end surface 4b of the rotor 4 by the elastic deformation of the friction member 26 and the elastic deformation of the armature plate 5 itself after the armature plate 5 abuts the friction member 26. Thus, the rotation of the rotor 4 is transmitted from the armature plate 5 to the driving shaft 20 of the compressor 2 through the outer plate 7, the elastic member 10, the inner plate 8, and the hub 6 by the friction between the friction member 26 and the armature plate 5 in a portion close to the inner periphery of the rotor 4, and by the friction between the rotor 4 and the armature plate 5 in a portion close to the outer periphery of the rotor 4.

Thus, if the compressor 2 becomes unable to rotate and slip occurs between the rotor 4 and the armature plate 5 for some reason, at the portion close to the inner periphery of the rotor 4, sliding occurs between the magnetic metal and the friction member 26 being nonmetal. Thus, the slide contact portion is not stuck by adhering. As a result, the slipping state is sustained and friction heat generated by the sliding between the rotor 4 and the armature plate 5 is transmitted to the temperature fuse 15. Thus, the temperature fuse 15 is rapidly fused and it is possible to reliably cut the connection of the clutch.

Incidentally, sliding at the portion close to the outer periphery of the rotor 4 is performed between the magnetic bodies made of the similar metal. A peripheral speed at the region close to the outer periphery of the rotor 4 is rather fast. Thus, even if partial adhesion occurs, since a difference in relative speeds is great and the generated friction heat is also large, a sticking phenomenon of the sliding surface does not occur.

Particularly, in the configuration example described above, the side end surface 4b of the rotor 4 is provided with the annular groove 24 which includes the outer magnetic blocking portion 21 and narrows a width of magnetic path (width of the first pole A in the radial direction) at the outside of the outer magnetic blocking portion 21 in the radial direction so as to dispose the magnetic path radially outward. Thus, the first pole A is configured in a position away from a rotation center of the rotor 4 and it is possible to improve the transmission of the torque from the rotor 4 to the armature plate 5. Incidentally, as the annular groove 24 is provided for narrowing the magnetic path width of the first pole A so as to dispose the magnetic path radially outward, there is a concern that a magnetic resistance may be increased if the magnetic path width of the first pole A is excessively narrowed. In this example, the width of the first pole A in the radial direction is set to be 70% or more of the width of the second pole B in the radial direction.

Figure 5:
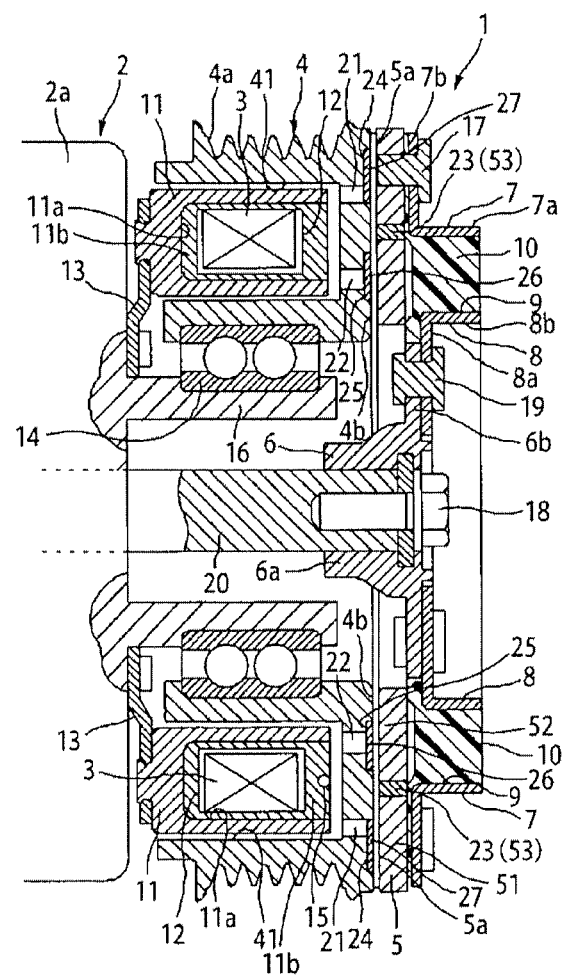
FIG. 5 is a cross-sectional view illustrating a modification example of the first embodiment of the electromagnetic clutch according to the invention.

Incidentally, in the configuration example described above, in the portion where the inner magnetic blocking portion 22 of the rotor 4 is formed, the annular groove 25 is formed to include this portion, and the friction member 26 is provided in the annular groove 25. In the portion where the outer magnetic blocking portion 21 is formed, only the annular groove 24 is formed on its outside to include this portion. However, as illustrated in FIG. 5, an annular friction member 27 may be further mounted on the annular groove 24 including the outer magnetic blocking portion 21. The friction member 27 is also configured of a non-magnetic material and is formed in an annular shape and a planar shape according to the size of the annular groove 24. Thus, the friction member 27 is fixed so as to slightly protrude from the side end surface 4b of the rotor 4.

According to such a configuration, when the excitation coil 3 is energized and the armature plate 5 is attracted to the rotor 4, the armature plate 5 comes into contact with the friction members 26 and 27 in both regions close to the inner periphery and close to the outer periphery of the side end surface 4b of the rotor 4 before the armature plate 5 comes in contact with the side end surface 4b of the rotor 4. Thus, it is possible to further stably transmit the torque and to further reduce a concern of adhesion or sticking. In addition, it is possible to further reduce occurrence of the impact noise.

Furthermore, in the configuration described above, an example is illustrated in which the outer magnetic blocking portion 21 or the inner magnetic blocking portion 22 is configured by forming arc-shaped long holes on a virtual circle centered on the driving shaft 20 at regular intervals. However, it may be configured by interposing an annular-shaped non-magnetic material centered on the driving shaft 20. Furthermore, in the configuration described above, an example is illustrated in which the intermediate magnetic blocking portion 23 is configured by interposing the annular-shaped non-magnetic material centered on the driving shaft 20. However, it may be configure by forming arc-shaped long holes on a virtual circle centered on the driving shaft 20 at regular intervals.

Second Embodiment

Figures 6A, 6B:
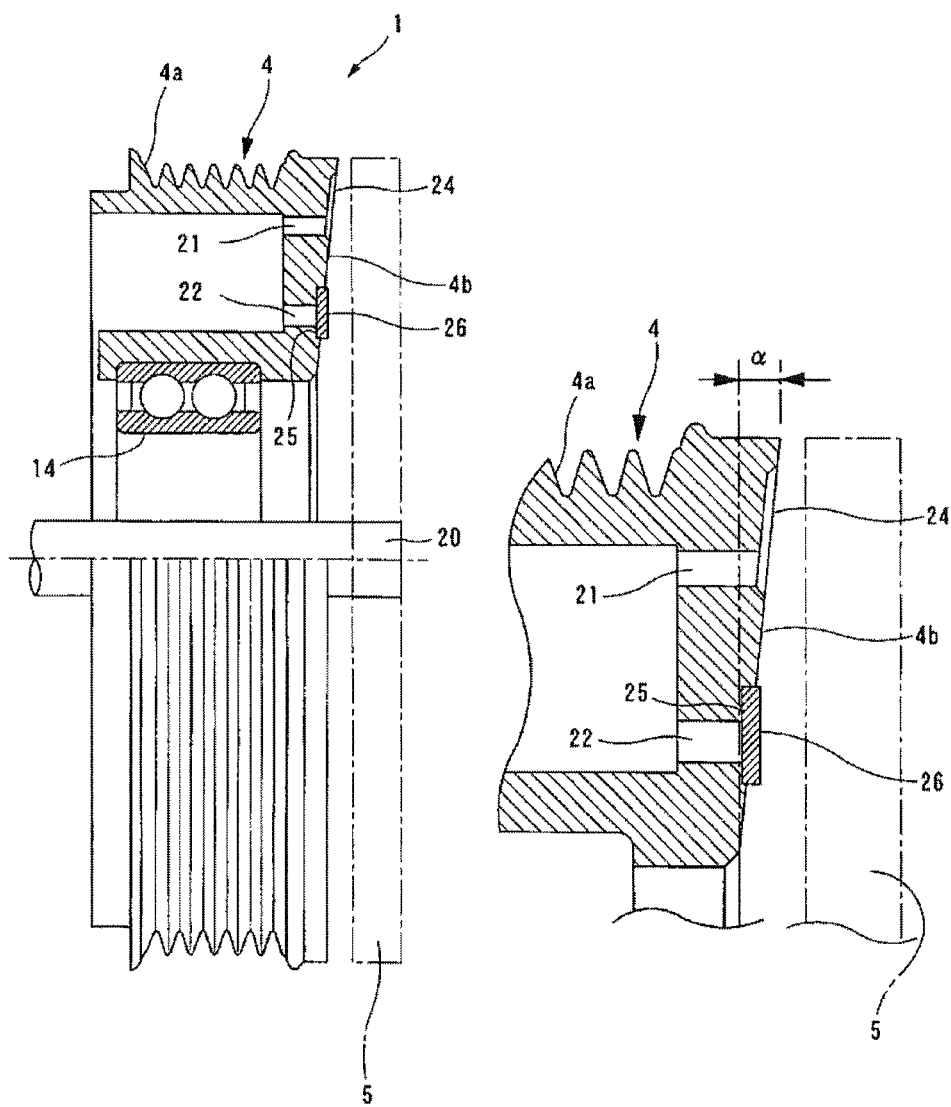
FIGS. 6A and 6B are cross-sectional views illustrating a second embodiment of an electromagnetic clutch according to the invention.

A second embodiment of an electromagnetic clutch 1 is illustrated in FIGS. 6A and 6B (for convenience of explanation, the description is exaggerated). The electromagnetic clutch 1 is different from that of the first embodiment in that a side end surface 4b of a rotor 4 facing an armature plate 5 is formed in a center concave shape including an linear inclined surface which is gradually inclined downward (continuously inclined such that the inner peripheral edge is lower than the outer peripheral edge of the rotor 4) on the inside of the rotor 4 in the axial direction toward the center of the rotor 4 in the radial direction. That is, in the de-energized state in which the armature plate 5 is not attracted, a distance separated from the armature plate 5 is decreased toward outside in the radial direction.

In this example, the friction member 26 provided in the annular groove 25 that is formed so as to include a portion where the inner magnetic blocking portion 22 of the rotor 4 is provided is formed such that the portion protruding from the side end surface 4b of the rotor 4 is not inclined (is not provided parallel to the side end surface 4b of the rotor 4) together with the side end surface 4b of the rotor 4, but is perpendicular to the driving shaft 20 from the portion outside the friction member 26 in the radial direction.

A protrusion amount (protrusion amount of the portion outside the friction member 26 in the radial direction) of the friction member 26 from the side end surface 4b and a center concave depth α (that is a distance between a plane perpendicular to the driving shaft 20 including the outer peripheral edge of the side end surface of the rotor and a plane perpendicular to the driving shaft 20 including the inner peripheral edge of the side end surface 4b of the rotor 4, and an amount by which the inner peripheral edge of the side end surface is lower than the outer peripheral edge of the side end surface) of the side end surface of the rotor are set based on evaluation results described below.

In order to evaluate a torque transmission ability that is one of the functions that are required for the electromagnetic clutch, a change in a static friction torque (N·m) with respect to a change in the center concave depth α (μm) of the side end surface of the rotor 4 was measured. The static friction torque of the electromagnetic clutch can be obtained by applying a voltage to the electromagnetic coil, attracting the armature plate to the rotor so as to engage, gradually adding a torque to the driving shaft connected to the armature, and measuring the torque that makes slip occur between the armature plate and the rotor which are engaged in a state where the rotor of the electromagnetic clutch is fixed so as not to rotate. Here, the test was performed by using rotors 4 having a diameter of the outer peripheral edge of the side end surface of Φ 112, a diameter of the inner peripheral edge of the side end surface of Φ 50, and three patterns of the protrusion amounts of the friction member 26 from the side end surface 4b of the rotor of 10 μm, 30 μm, and 50 μm that may be selected. Measured results of the static friction torque indicate characteristics illustrated by each line in FIG. 7.

Figure 7:
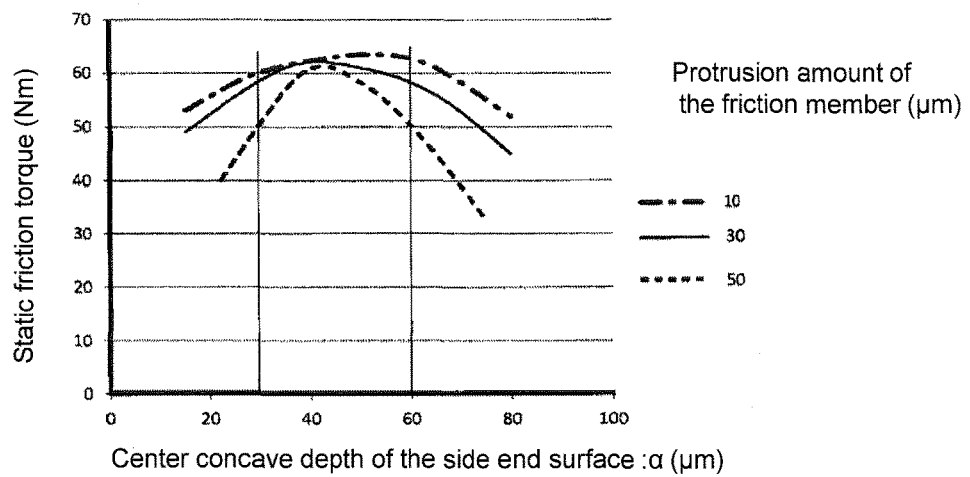
FIG. 7 is a characteristic line diagram illustrating a relationship of a static friction torque with respect to setting of a center concave depth of the side end surface of the rotor.

As can be seen from FIG. 7, the static friction torque indicates the highest value when the center concave depth α of the side end surface 4b of the rotor 4 is 40 μm to 50 μm, and if the center concave depth α is out of this proper region, the static friction torque is lowered. This may be because if the center concave depth α of the side end surface 4b of the rotor 4 is excessively great, when the side end surface 4b of the rotor 4 abuts the armature plate 5 at the portion close to the outer edge, the portion close to the inner edge of the rotor is in a state of being separated from the armature plate 5, and thus the attraction force over an entire surface of the armature is lowered. If the center concave depth α of the side end surface 4b of the rotor 4 is excessively small, the armature plate 5 is in a state of mainly abutting by the friction member 26 protruding in the portion close to the inner edge of the side end surface 4b, and a surface pressure in the region close to the outer periphery of the side end surface of the rotor 4 is weakened.

Furthermore, as can be seen in the same view, even when the center concave depth α is deviated from the proper region, decreasing of the static friction torque can be lowered in a case where the protrusion amount of the friction member 26 is 10 μm compared to a case where the protrusion amount of the friction member 26 is 50 μm.

It is preferable that the static friction torque is ensured to be, for example, 50 N·m or more considering the torque generated during operation of the compressor. Thus, it seems to be preferable that the protrusion amount of the friction member 26 is small from the viewpoint of stably ensuring the transmission torque regardless of the deviation in the center concave depth α. However, since the friction member 26 wears with use, if the friction member 26 were set to be an excessively small value, it would lead to sliding between metals in the vicinity of the inner periphery by wear of the friction member 26 in an early stage.

Consequently, considering these design requirements and deviations required for manufacturing, it is preferable to regard 10 μm of the protrusion amount of the friction member 26 as the lower limit value in a tolerance range. Meanwhile, assuming that a tolerance range of the protrusion amount of the friction member is 40 μm, the upper limit value of the protrusion amount is 50 μm. As illustrated in FIG. 7, setting the center concave depth α with a range of 30 μm to 60 μm and thereby it is possible to ensure the static friction torque (50 N·m or more) to be a target even if the protrusion amount of the friction member 26 is varied in a range from the upper limit value (50 μm) to the lower limit value (10 μm).

Consequently, it is preferable that the center concave depth α is set to be a range of 30 μm to 60 μm and the protrusion amount of the friction member 26 is set to be a range of 10 μm to 50 μm. Moreover, it is further preferable that the protrusion amount of the friction member 26 is set in a range of 15 μm to 40 μm to reduce the variation of the static friction torque.

Figure 8:
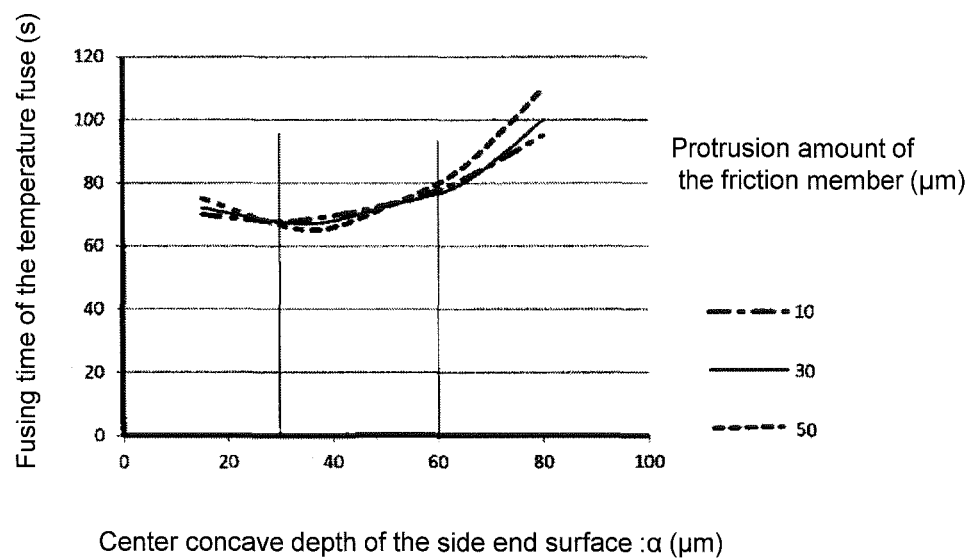
FIG. 8 is a characteristic line diagram illustrating a relationship of a fusing time of a temperature fuse with respect to setting of the center concave depth of the side end surface of the rotor.

Next, in order to investigate whether the temperature fuse 15 is appropriately fused during lock of the compressor and the connection of the clutch can be cut, a time (fusing time of the temperature fuse) until the connection of the clutch was released by the temperature fuse 15 being fused was measured (FIG. 8). The test was performed by rotating the rotor 4 of the electromagnetic clutch, which was used for the static friction test of FIG. 7 described above, while slipping with the armature plate 5 that was forcedly non-rotatable.

Here, the fusing time (sec) of the temperature fuse is a time until the temperature fuse 15 is fused (electromagnetic attracting force that attracts the armature plate 5 to the rotor 4 is extinguished) by friction heat generated by the slip from the slip being started between the rotor 4 that is rotated by receiving the rotational force from an engine and the armature plate 5 that is connected to the driving shaft 20 of the compressor 2 that becomes unable to rotate. It is preferable to be shorter so as not to apply a burden to the engine or the belt, for example, within 80 seconds as a target.

As illustrated in FIG. 8, characteristics of the fusing time of the temperature fuse indicated substantially the same tendency as characteristics of the static friction torque. That is, if the center concave depth α of the side end surface of the rotor 4 is greater or smaller than the proper range, the static friction torque is decreased. Thus, occurring friction heat may be decreased and the time required until the temperature fuse is fused may be increased.

In a set of the fusing tests of the temperature fuse, the fuse was safely fused and the sticking phenomenon did not occur in all tests, while differences in time until the temperature fuse was fused existed between each test. Furthermore, as illustrated in FIG. 8, if the center concave depth α is set to be in the proper range (30 μm to 60 μm) in FIG. 7, it is possible to makes the fusing time of the fuse within the target time (within 80 seconds) even if the protrusion amount of the friction member 26 is varied in a range (protrusion amount is 10 μm to 50 μm) among the samples.

Thus, it is preferable that the center concave depth α of the side end surface of the rotor is set to be in a range of 30 μm to 60 μm from the viewpoint of ensuring a required transmission torque and rapidly fusing the temperature fuse 15 during lock of the compressor. Furthermore, it is preferable that the protrusion amount of the friction member 26 at its outside portion in the radial direction is set to be in a range of 10 μm to 50 μm, and it is further preferable that the protrusion amount of the friction member 26 at its outside portion in the radial direction is set to be a range of 15 μm to 40 μm. Furthermore, it is preferable that a center value of the tolerance of the center concave depth α of the side end surface of the rotor is set to be proximately 1.5 times the protrusion amount of the friction member 26 from the side end surface of the rotor 4.

In addition, since other configurations are the same as the configurations illustrated in FIGS. 1A and 1B, the same reference numerals are given to the same portions and the description will be omitted.

In such the configuration, the friction member 26 comes into contact with the armature plate 5 in the region close to the inner periphery in which the peripheral speed is slow and thereby it is possible to prevent the sticking phenomenon by preventing slip between metals when the compressor 2 becomes unable to rotate. Furthermore, since the side end surface 4b of the rotor 4 has the center concave shape, it is possible to ensure a sufficient surface pressure and then to maintain the transmission torque even in the region close to the outer periphery of the rotor 4.

That is, if the friction member 26 comes into contact with the armature plate 5, there is a concern that the surface pressure is low and the transmission torque is decreased in the portion outside from the contact portion in the radial direction only by protruding the friction member 26 provided in the portion close to the inner periphery of the rotor 4. However, the side end surface 4b of the rotor 4 has the center concave shape and thereby the outer periphery side further than the friction member 26 can actively come into contact with the armature plate from initial use and the friction torque can be stably ensured from initial use.

In addition, in the first embodiment in which the side end surface of the rotor 4 does not have the center concave shape, the friction member 26 comes into contact with the armature plate 5 prior to the portion close to the outer periphery of the rotor 4 and thereby a process of the wear of the friction member 26 is fast. As a result, in a using situation in which the number of times of On-Off of the electromagnetic clutch 1 is great, the preventing function of sticking may be early deteriorated.

On the other hand, in the second embodiment in which the side end surface 4b of the rotor 4 has the center concave shape, both the metal surface of the side end surface 4b on the outer periphery side and the friction member 26 on the inner periphery side can come into contact with the armature plate 5 from initial use, significant wear only in the friction member 26 can be avoided, and the avoiding function of sticking between the rotor 4 and the armature plate 5 can be sustained over a further long period of time.

Moreover, in the example described above, the side end surface of the rotor is configured to have the center concave shape such that a separation distance between the side end surface of the rotor and the armature plate is decreased toward the outside in the radial direction, but instead thereof, even if the surface (contact surface) of the armature plate facing the side end surface of the rotor has a similar center concave shape, the same operational effects can be expected.

Figures 9A, 9B:
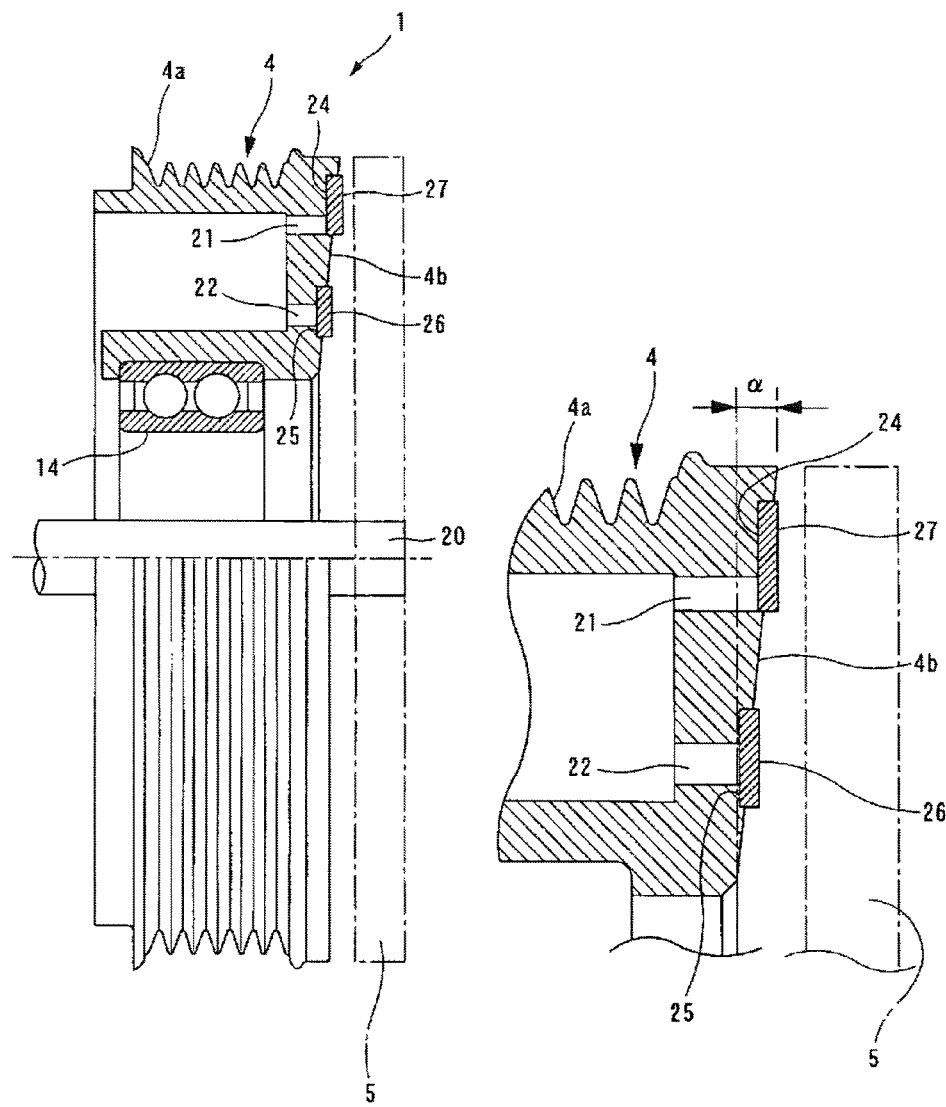
FIGS. 9A and 9B are cross-sectional views illustrating a modification example of the second embodiment of the electromagnetic clutch according to the invention.
Figure 10A:
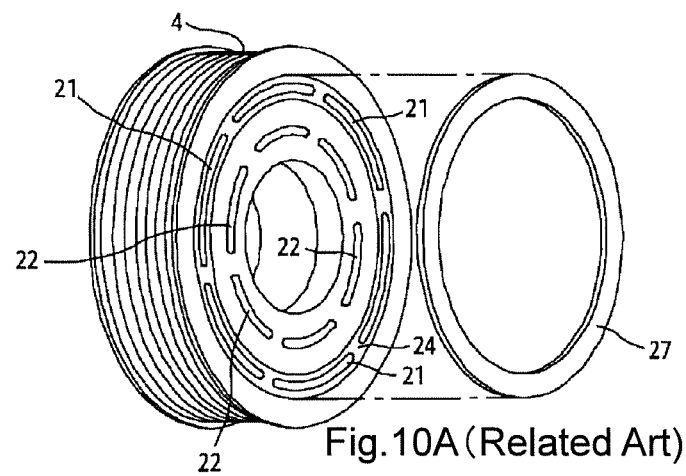
FIGS. 10A and 10B are views illustrating an electromagnetic clutch of the related art.
Figure 10B:
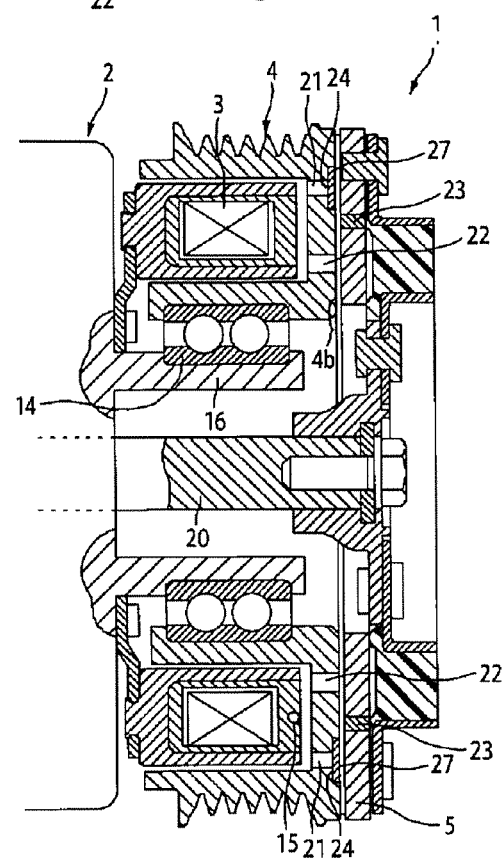

Moreover, in the example described above, it is illustrated where the side end surface 4b of the rotor 4 having the center concave shape is applied to the configuration in which the friction member 26 is provided in the annular groove 25 formed in the portion where the inner magnetic blocking portion 22 is formed, but as illustrated in FIGS. 9A and 9B, the side end surface 4b of the rotor 4 having the center concave shape may be applied to a configuration in which the friction member 27 is also provided in the annular groove 24 where the outer magnetic blocking portion 21 is formed, both the friction member 26 on the inside and the friction member 27 on the outside come into contact with the armature plate 5 from initial use, thereby preventing significant wearing of only the friction member 26 on the inside.

DESCRIPTION OF REFERENCE NUMERALS 2 compressor
3 excitation coil
4 rotor
4b side end surface
5 armature plate
14 bearing
15 temperature fuse
20 driving shaft
21 outer magnetic blocking portion
22 inner magnetic blocking portion
23 intermediate magnetic blocking portion
24 annular groove
25 annular groove
26 friction member
27 friction member
A first pole
B second pole
C third pole
D fourth pole

The invention claimed is:

1. An electromagnetic clutch comprising:
a rotor that is formed of a magnetic material and is rotated by receiving a rotational force from a rotation driving source;
an armature plate that is formed of the magnetic material, is connected to a driving shaft of a compressor to be relatively non-rotatable, and is disposed to face a side end surface of the rotor across a gap;
an excitation coil that is accommodated in the inside of the rotor, forms a magnetic circuit through the rotor and the armature plate by being energized, and generates an attracting force magnetically attracting the armature plate onto the rotor;
a temperature fuse that is disposed on the excitation coil side further than the side end surface of the rotor and blocks the electric connection to the excitation coil when exceeding a predetermined temperature;
an outer magnetic blocking portion provided on the side end surface of the rotor, which is configured with an annular shape centered on the driving shaft or a plurality of arc shapes disposed on a virtual circle centered on the driving shaft;
an inner magnetic blocking portion provided on the side end surface of the rotor, which is configured with an annular shape centered on the driving shaft or a plurality of arc shapes disposed on the virtual circle centered on the driving shaft, which is provided inside further than the outer magnetic blocking portion in a radial direction; and
an intermediate magnetic blocking portion provided in the armature plate, which is configured with an annular shape centered on the driving shaft or a plurality of arc shapes disposed on the virtual circle centered on the driving shaft, which is formed in a position facing a position between the outer magnetic blocking portion and the inner magnetic blocking portion in the radial direction,
wherein four poles are formed by opposing surfaces formed on outside and inside of each blocking portion of the outer magnetic blocking portion, the intermediate magnetic blocking portion, and the inner magnetic blocking portion in the radial direction by disposing the rotor and the armature plate so as to face each other,
wherein an annular groove is formed on the side end surface of the rotor so as to include the inner magnetic blocking portion,
wherein a first friction member protruding from the side end surface of the rotor is disposed in the annular groove, and wherein the side end surface of the rotor is formed in a center concave shape such that a separation distance from the armature plate is reduced toward the outside in the radial direction during electric disconnection to the excitation coil.

2. The electromagnetic clutch according to claim 1, characterized in that an annular groove, which includes the outer magnetic blocking portion and narrows a radial width of the pole at the outside of the outer magnetic blocking portion in the radial direction so as to dispose the pole radially outward, is formed on the side end surface of the rotor.

3. The electromagnetic clutch according to claim 2, characterized in that a second friction member protruding from the side end surface of the rotor is further disposed in the annular groove formed so as to include the outer magnetic blocking portion.

4. The electromagnetic clutch according to claim 1, wherein the poles configure a first pole, a second pole, a third pole, and a fourth pole from the outside in the radial direction, and the third pole has a width in the radial direction of 60% or more of a width of the second pole in the radial direction.

5. The electromagnetic clutch according to claim 1, wherein the side end surface of the rotor is formed such that an inner peripheral edge of the side end surface is lower in an axial direction toward the rotor than an outer peripheral edge of the side end surface by 30 µm to 60 µm.

6. The electromagnetic clutch according to claim 1, wherein a protrusion amount of the friction member from the side end surface of the rotor is 10 µm to 50 µm.

7. An electromagnetic clutch comprising:
a rotor that is formed of a magnetic material and is rotated by receiving a rotational force from a rotation driving source;
an armature plate that is formed of the magnetic material, is connected to a driving shaft of a compressor to be relatively non-rotatable, and is disposed to face a side end surface of the rotor across a gap;
an excitation coil that is accommodated in the inside of the rotor, forms a magnetic circuit through the rotor and the armature plate by being energized, and generates an attracting force magnetically attracting the armature plate onto the rotor;
a temperature fuse that is disposed on the excitation coil side further than the side end surface of the rotor and blocks the electric connection to the excitation coil when exceeding a predetermined temperature;
an outer magnetic blocking portion provided on the side end surface of the rotor, which is configured with an annular shape centered on the driving shaft or a plurality of arc shapes disposed on a virtual circle centered on the driving shaft;
an inner magnetic blocking portion provided on the side end surface of the rotor, which is configured with an annular shape centered on the driving shaft or a plurality of arc shapes disposed on the virtual circle centered on the driving shaft, which is provided inside further than the outer magnetic blocking portion in a radial direction; and
an intermediate magnetic blocking portion provided in the armature plate, which is configured with an annular shape centered on the driving shaft or a plurality of arc shapes disposed on the virtual circle centered on the driving shaft, which is formed in a position facing a position between the outer magnetic blocking portion and the inner magnetic blocking portion in the radial direction,
wherein four poles are formed by opposing surfaces formed on outside and inside of each blocking portion of the outer magnetic blocking portion, the intermediate magnetic blocking portion, and the inner magnetic blocking portion in the radial direction by disposing the rotor and the armature plate so as to face each other,
wherein an annular groove is formed on the side end surface of the rotor so as to include the inner magnetic blocking portion,
wherein a first friction member protruding from the side end surface of the rotor is disposed in the annular groove, and
wherein a side end surface of the armature plate facing the side end surface of the rotor is formed in a center concave shape such that a separation distance from the side end surface of the rotor is reduced toward the outside in the radial direction during electric disconnection to the excitation coil.

8. The electromagnetic clutch according to claim 7, characterized in that an annular groove, which includes the outer magnetic blocking portion and narrows a radial width of the pole at the outside of the outer magnetic blocking portion in the radial direction so as to dispose the pole radially outward, is formed on the side end surface of the rotor.

9. The electromagnetic clutch according to claim 8, characterized in that a second friction member protruding from the side end surface of the rotor is further disposed in the annular groove formed so as to include the outer magnetic blocking portion.

10. The electromagnetic clutch according to claim 7, wherein the poles configure a first pole, a second pole, a third pole, and a fourth pole from the outside in the radial direction, and the third pole has a width in the radial direction of 60% or more of a width of the second pole in the radial direction.

11. The electromagnetic clutch according to claim 7, wherein a side end surface of the armature plate is formed such that an inner peripheral edge of the side end surface is lower in an axial direction toward the rotor than an outer peripheral edge of the side end surface by 30 µm to 60 µm.

12. The electromagnetic clutch according to claim 7, wherein a protrusion amount of the friction member from the side end surface of the rotor is 10 µm to 50 µm.

* * * * *